United States Patent [19]
Klein

[11] 3,873,768
[45] Mar. 25, 1975

[54] GATED BIAS NOISE SUPPRESSION CIRCUITRY

[75] Inventor: Arthur Harold Klein, Oakfield, N.Y.

[73] Assignee: GTE Sylvania Incorporated, Stamford, Conn.

[22] Filed: Nov. 28, 1973

[21] Appl. No.: 419,860

[52] U.S. Cl. .................. 178/7.3 R, 178/DIG. 12
[51] Int. Cl. .................. H04n 5/08
[58] Field of Search ........ 178/7.3 S, 7.5 S, DIG. 12; 307/231, 235 R; 328/139, 146, 147, 150; 330/30 D

[56] References Cited

UNITED STATES PATENTS

| | | | |
|---|---|---|---|
| 2,841,646 | 7/1958 | Thomas | 178/7.5 S |
| 3,569,844 | 3/1971 | Lynn | 178/7.3 S |
| 3,740,470 | 6/1973 | Rhee | 178/7.3 S |

Primary Examiner—Richard Murray
Assistant Examiner—Aristotelis M. Psitos
Attorney, Agent, or Firm—Norman J. O'Malley; Thomas H. Buffton; Cyril A. Krenzer

[57] ABSTRACT

Gated bias noise suppression circuitry for a television receiver having a source of signals including video, blanking, and synchronizing pulse signals includes a sync pulse separator and a noise gate each coupled to the signal source and a gated bias means coupling a sync pulse signal from the output of the sync pulse separator to the noise gate to alter the bias potential applied therefrom to the sync pulse separator in a manner such that the bias potential is gated in time coincidence with the sync pulse signals whereby the bias level may be adjusted to a level intermediate the blanking and sync pulse tip levels.

9 Claims, 5 Drawing Figures

GATED BIAS NOISE SUPPRESSION CIRCUITRY

CROSS-REFERENCE TO OTHER APPLICATIONS

Noise Suppression Circuit filed in the name of Dong Woo Rhee on Dec. 30, 1971, bearing U.S. Pat. No. 3,740,470, and assigned to the same assignee as the present application.

BACKGROUND OF THE INVENTION

Signal receivers and particularly television receivers normally include apparatus for intercepting transmitted signals and converting these signals to a video signal. The video signal not only includes the information necessary to modulate a display device in a manner to provide an image display but also includes synchronizing information in the form of sync pulse signals coincident in time with blanking signals used to blank out the image display.

The sync pulse signals are stripped from the blanking signals in a sync pulse separator stage and applied to deflection circuitry in order to control the horizontal and vertical scanning of the image reproducer or cathode ray tube. Thus, the scanning raster, blanking, and the display information are included in the original signal and utilized to provided a desired image reproduction on the cathode ray tube.

One of the problems associated with controlling the horizontal and vertical scanning of the cathode ray tube is undesired noise signals. Unfortunately, noise signals in the received signal tend to get through the sync pulse separator stage and undesirably act in the same manner as the sync pulse signals to trigger the deflection circuitry. However, the false and undesired scanning activation by the uncontrolled and untimed noise signals is of course deleterious to the desired operation of the apparatus.

Numerous schemes and circuits have been devised and employed to eliminate or at least reduce this undesired scan activation by noise signals. For example, noise cancellation circuits are common wherein the noise signal is phase inverted and fed back to provide cancellation. Another well-known technique employs a noise gate wherein a DC bias potential is pre-set at a level slightly greater than the level of the tips of the sync pulse signals. Thus, noise of an amplitude greater than the sync pulse signals is clipped and prevented from triggering the deflection circuitry. Moreover, the above-mentioned DC bias system is frequently combined with a noise cancellation technique whereby both signal clipping and signal cancellation features are employed.

Although the above-described clipping and cancellation techniques for noise elimination have been and still are employed with a great deal of success, there are some instances where an improved condition is highly desirable. More specifically, it is known that precise control of a bias level with respect to the tip of the sync pulse signals presents problems when the magnitude of the received signal continuously varies as is common in intercepted television signals.

OBJECTS AND SUMMARY OF THE INVENTION

An object of the present invention is to provide enhanced noise suppression circuitry for a signal receiver. Another object of the invention is to provide improved noise-gate capabilities for a television receiver. Still another object of the invention is to improve the bias capabilities in a noise-gate circuit for noise suppression circuitry. A further object of the invention is to enhance the noise-gate circuit of a television receiver by gating the bias provided thereby for the sync pulse separator circuitry.

These and other and further objects, advantages and capbilities are achieved in one aspect of the invention by a signal receiver having an intercepted signal including video, sync, and blanking signals with a sync pulse separator for stripping the sync pulse signals and a noise gate circuit with a bias gating means coupled to the noise gate circuit for gating the bias potential applied to the noise gate circuit whereby the gated bias potential may be set at a level intermediate the blanking and tip of sync pulse signal levels.

PREFERRED EMBODIMENTS OF THE INVENTION

For a better understanding of the present invention together with other and further objects, advantages and capabilities thereof, reference is made to the following disclosure and appended claims in conjunction with the accompanying drawings.

Figure 1:
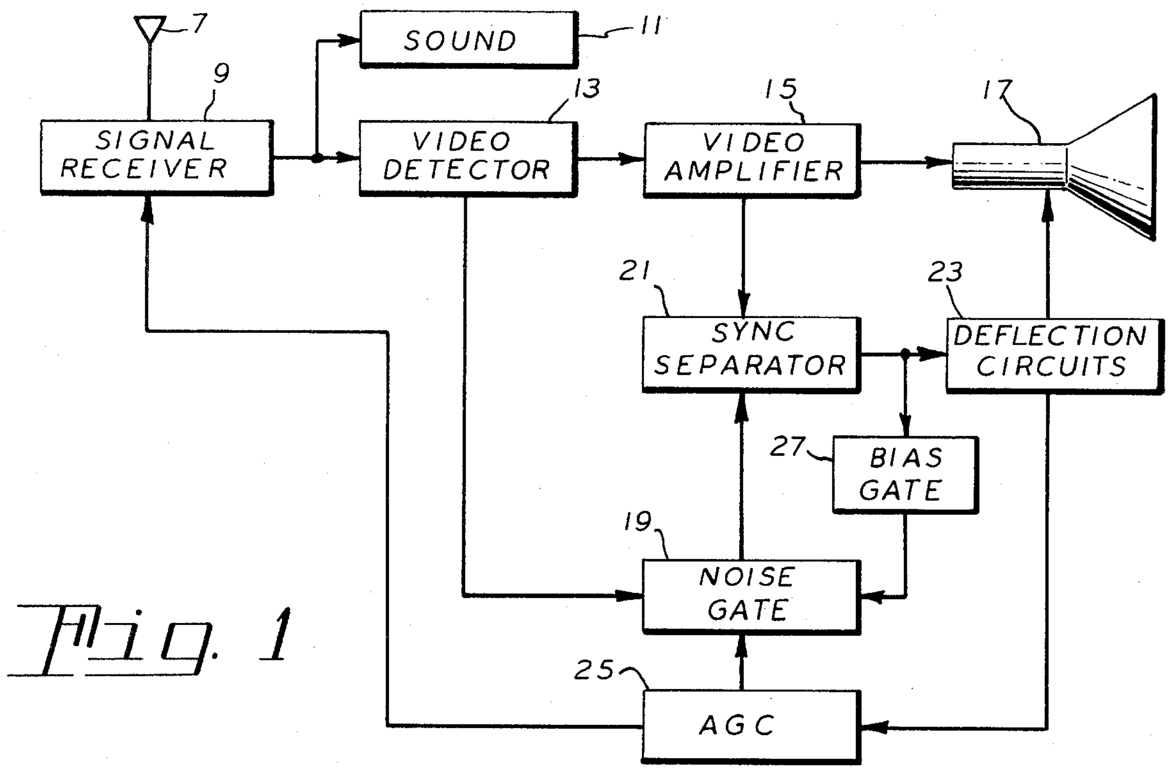
FIG. 1 is a diagrammatic illustration, in block form, of a television receiver employing an embodiment of the invention.

Referring to FIG. 1 of the drawings, a television receiver includes the usual antenna 7 coupled to a signal receiver 9 including RF and IF amplifier and detector stages. The signal receiver 9 provides an output which is applied to a sound channel 11 and to a video detector stage 13. In turn, the video detector stage 13 provides a video signal which includes video, blanking and synchronizing pulse signals which are applied via a video amplifier stage 15 to an image reproducer or cathode ray tube 17. Also, the video signals from the video detector stage 13 are applied to a noise gate circuit 19.

The noise gate circuit 19 is coupled to a sync pulse separator circuit 21 which is also coupled to the video amplifier stage 15. The sync pulse separator circuit 21 provides sync pulse signals stripped from the blanking signal portion of the video signal and applies these sync pulse signals to deflection circuitry 23. The deflection circuitry 23 responds to the sync pulse signals to effect control signals for a desired scanning control of the cathode ray tube 17. Morover, the deflection circuitry 23 provides gating signals to an AGC system 25 which is coupled back to the signal receiver 9 and to the noise gate circuit 19.

Additionally, a bias gating means 27 couples the sync pulse signals at the output of the sync pulse separator circuit 21 to the noise gate circuit 19. In turn, the bias potential available at the noise gate circuit 19 is gated in time coincidence with the sync pulse signals and applied to the sync pulse separator circuit 21.

Figure 2:
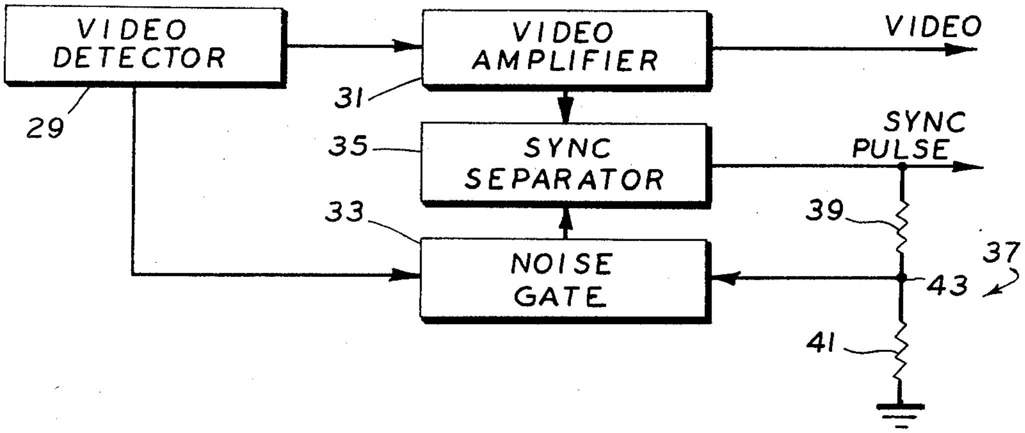
FIG. 2 is a block and schematic illustration of a preferred embodiment of the invention.

More specifically, FIG. 2 illustrates a source of video signals in the form of a video detector stage 29 coupled to a video amplifier circuit 31 and to a noise gate circuit 33. In turn, the video amplifier circuit 31 and noise gate circuit 33 are coupled to a sync pulse separator circuit 35. Moreover, the output of the sync pulse separator circuits 35 is coupled to a bias gating circuit 37 in the form of a pair of resistors 39 and 41 series connected to circuit ground and having a junction 43 coupled to the noise gate circuit 33.

Preferably, the noise gate circuit 33 and sync pulse separator circuit 35 are of the integrated circuit form disposed on a monolithic chip as set forth and detailed in the cross-referenced patent entitled "Noise Suppression Circuit." Moreover, the AGC circuitry employed in the above-mentioned application is equally applicable in the present instance.

Figure 3:
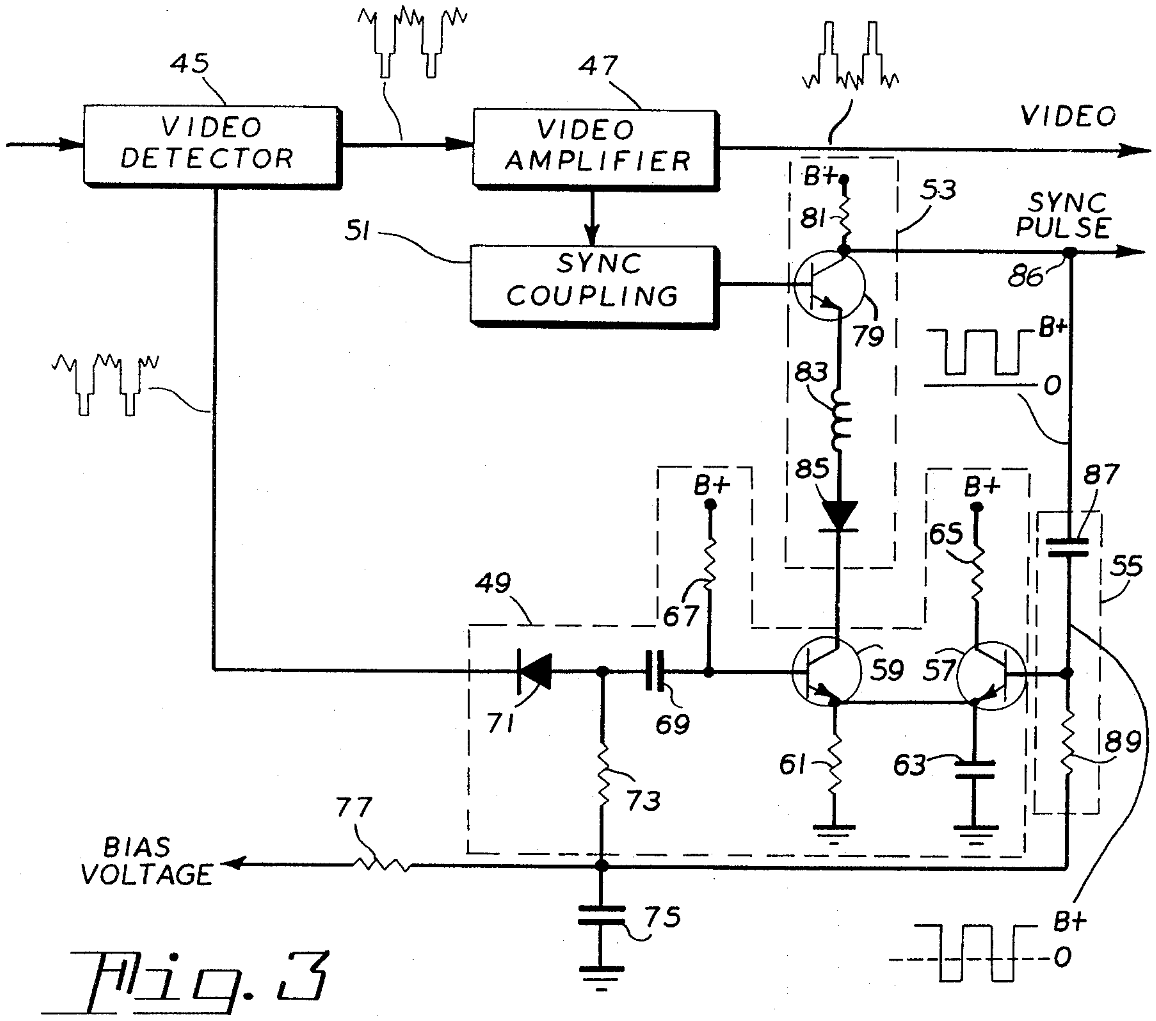
FIG. 3 is a block and schematic illustration of an alternate embodiment of the invention.

FIG. 3 illustrates another embodiment of the invention wherein a source of video signals includes a video detector stage 45 which is coupled to a video amplifier stage 47. A signal from the video detector stage 45 is also applied to a noise-gate circuit 49. Moreover, a sync coupling network 51 couples the video amplifier stage 47 to a sync pulse separator stage 53. The sync pulse separator stage 53 is, in turn, coupled to the noise-gate circuit 49 and to a bias gating means 55.

More specifically, the noise-gate circuit 49 includes first and second transistors 57 and 59 each having an emitter electrode coupled to circuit ground by way of a parallel connected resistor 61 and capacitor 63. The collector electrode of the first transistor 57 is coupled to a potential source B+ by a resistor 65 while the base electrode is coupled to the bias gating means 55. The collector electrode of the second transistor 59 is connected to the sync pulse separator stage 53 while the base electrode is coupled by a resistor 67 to a potential source B+ and by a series connected capacitor 69 and diode 71 to the video detector stage 45. Moreover, the junction of the series connected capacitor 69 and diode 71 is connected by a resistor 73, the bias gating means 55, to a capacitor 75 connected to circuit ground, and to a resistor 77 coupled to a noise-gate bias voltage source.

Also, the sync pulse separator stage 53 includes a transistor 79 having a base electrode coupled to the sync coupling network 51, a collector electrode providing sync pulse output signals and coupled by a resistor 81 to a potential source, and an emitter electrode coupled via a series connected inductor 83 and diode 85 to the noise-gate circuit. Moreover, the biase-gating means 55 includes a series connected capacitor 87 and resistor 89 with the capacitor 87 coupled via an output terminal 86 to the collector electrode of the transistor 79 of the sync pulse separator stage 53, the resistor 89 coupled to the noise-gate bias voltage source and via a series connected resistor 73 and capacitor 69 to the second transistor 59 of the noise-gate circuit 49, and the junction of the series connected capacitor 87 and resistor 89 coupled to the first transistor 57 of the noise-gate circuit 49.

Figure 4:
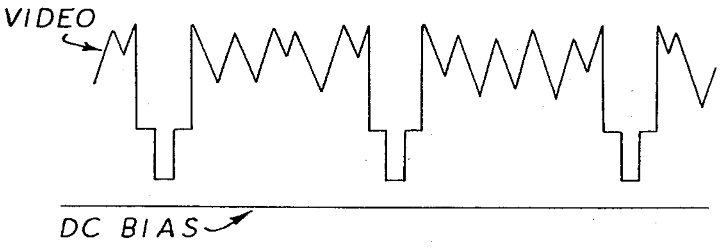
FIGS. 4 and 5 are graphic illustrations to assist in explaining the invention.

As to operation, a video signal available at the output of the video detector stage 13 and including video, sync pulse, blanking, and undesired noise signals is applied to the noise-gate circuit 19. The noise-gate circuit in prior art circuitry provided a DC bias level of a magnitude slightly greater than the magnitude of the tips of the sync pulse signals, (FIG. 4). Thus, a noise pulse of a magnitude greater than the DC bias level was clipped and applied to the sync separator circuit 21.

Also, a video signal of opposite polarity available at the output of the video amplifier stage 15 is applied to the sync separator circuit 21. Thus, a noise signal in the output from the video amplifier stage 15 is cancelled by the noise pulse of a magnitude greater than the DC bias level derived from the noise-gate circuit 19.

As a result, prior art circuitry effected cancellation of noise signals of a magnitude greater than the magnitude of the DC bias level provided by the noise-gate circuit 19. Moreover, in a manner well-known in the art an AGC system 25 was coupled to the noise-gate circuit 19 and to the signal receiver 9 whereby the magnitude of the bias level was varied in accordance with variations in the magnitude of the received signals. Thus, the bias level and the sync pulse tips track one another and a desired minimal separation in potential therebetween is maintained.

Figure 5:
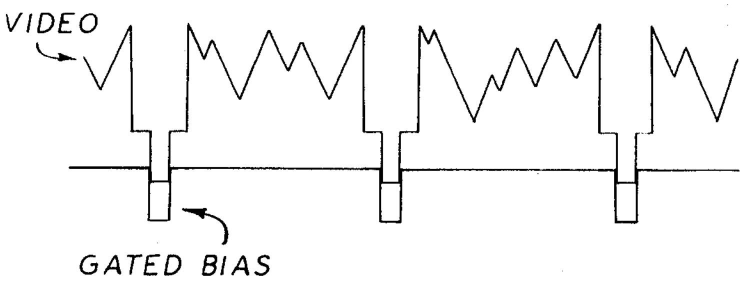

However, it has been found that gating the above-mentioned bias level (FIG. 5) provides numerous advantages. As can be seen, a bias gating means 27 responds to the sync pulse signals available at the output of the sync pulse separator circuit 21 to effect gating of the bias level of the noise-gate circuit 19. Moreover, the bias level is gated in time synchronism with the occurrence of the sync pulse signals. Thus, the gated bias level (FIG. 5) may be adjusted to a preferred level intermediate the blanking signal level and the tips of the sync pulse signals.

As to particular embodiments, FIG. 2 illustrates a voltage divider 37 whereby the sync pulse signals available from a sync separator circuit 35 are applied to a noise-gate circuit 33. Moreover, the above-mentioned circuitry may be of the integrated semiconductor chip form as set forth in the previously-mentioned patent entitled "Noise Suppression Circuit", U.S. Pat. No. 3,740,470.

Additionally, FIG. 3 illustrates an alternate embodiment wherein sync pulse signals available at the output terminal 86 of the sync pulse separation means 53 are AC coupled via the series connected capacitor 87 and resistors 89 and 73 to the junction of the diode 71 and capacitor 69 of the noise-gate circuit 49. Therefore, the steady-stage bias level, established by the potential source B+ and fixed resistor 67, is gated in accordance with the time sequence of the sync pulse signals.

Thus, there has been provided an enhanced noise-suppression circuit for a television receiver having numerous advantages over other known techniques. The gated-bias technique permits a bias level setting intermediate blanking and sync tip levels which is far less critical with respect to the sync tip level and greatly reduces the level at which undesired noise signals are removed from the video signal. Moreover, the system is inexpensive of components and complexity while improving the capabilities of the existing circuitry.

While there has been shown and described what is at present considered the preferred embodiments of the invention, it will be obvious to those skilled in the art that various changes and modifications may be made therein without departing from the invention as defined by the appended claims. What is claimed is:

1. Noise suppression circuitry for a television receiver comprising:

a signal source providing video signals, synchronizing pulse signals, and blanking pulse signals having a black level;

sync pulse separating means coupled to said signal source;

noise gate circuitry coupled to said signal source and to said sync pulse separating means, said circuitry providing a bias potential for said sync pulse separating means; and bias gating means coupling the output of said sync pulse separating means to said noise gate circuitry to effect gating of said bias potential applied to said sync pulse separating means in time coincidence with application thereto of synchronizing pulse signals from said signal source.

2. The noise suppression circuitry of claim 1 including automatic gain control (AGC) means coupled to said signal source and to said noise gate circuitry to effect a magnitude shift in said bias potential in accordance with a similar magnitude shift in said synchronizing pulse signals applied to said sync pulse separating means.

3. The noise suppression circuitry of claim 1 wherein said bias gating means includes a voltage divider connected intermediate said output of said sync pulse separating means and a potential reference level and coupled to said noise gate circuitry to effect gating of said bias potential applied to said sync pulse separating means.

4. The noise suppression circuitry of claim 3 wherein said voltage divider is in the form of a pair of series connected resistors.

5. The noise suppression circuitry of claim 1 including a capacitor AC coupling said bias grating means to said noise gate circuitry.

6. Gated bias circuitry suitable for a signal receiver comprising:

a signal source providing video, blanking, and sync pulse signals;

sync pulse separator means coupled to said source;

noise gate circuitry coupled to said source and to said sync pulse separator means, said circuitry providing a bias potential for said sync pulse separator means at a level intermediate said blanking and the tip of said sync pulse signals; and bias gating means coupling the output of said sync pulse separator means to said noise gate circuitry to effect gating of said bias potential applied to said sync pulse separator means at a period coincident with the application thereto of a sync pulse signal from said signal source.

7. The gated bias circuitry of claim 6 wherein said signal source, said sync pulse separation means, and said noise gate circuitry are in integrated form and included on a monolithic semiconductor chip and said bias gating means is in the form of a voltage divider external to the semiconductor chip and coupling said output of said sync pulse separator means to a potential reference level and to said noise gate circuitry.

8. The gated bias circuitry of claim 6 including automatic gain control (AGC) circuitry coupled to said signal source and to said noise gate circuitry whereby variations in magnitude of said sync pulse signals are tracked by similar variations in magnitude of said bias potential applied to said noise gate circuitry.

9. The gated bias circuitry of claim 6 wherein said bias gating means AC couples said output of said sync pulse separator means to said noise gate circuitry.

* * * * *